United States Patent
Zen et al.

(10) Patent No.: US 10,605,655 B2
(45) Date of Patent: Mar. 31, 2020

(54) PHOTON DETECTION DEVICE AND PHOTON DETECTION METHOD

(71) Applicant: National Institute of Advanced Industrial Science and Technology, Tokyo (JP)

(72) Inventors: Nobuyuki Zen, Tsukuba (JP); Yasunori Mawatari, Tsukuba (JP); Go Fujii, Tsukuba (JP); Nobuyuki Yoshikawa, Kanagawa (JP)

(73) Assignee: National Insititute of Advanced Industrial Science & Technology, Chiyoda-Ku, Tokyo (JP)

( * ) Notice: Subject to any disclaimer, the term of this patent is extended or adjusted under 35 U.S.C. 154(b) by 168 days.

(21) Appl. No.: 15/736,381

(22) PCT Filed: Jun. 15, 2016

(86) PCT No.: PCT/JP2016/067747
§ 371 (c)(1),
(2) Date: Dec. 14, 2017

(87) PCT Pub. No.: WO2016/204168
PCT Pub. Date: Dec. 22, 2016

(65) Prior Publication Data
US 2018/0188107 A1    Jul. 5, 2018

(30) Foreign Application Priority Data

Jun. 19, 2015  (JP) .................................. 2015-123764

(51) Int. Cl.
*G01J 1/44*       (2006.01)
*G01J 1/02*       (2006.01)
(Continued)

(52) U.S. Cl.
CPC . *G01J 1/44* (2013.01); *G01J 1/02* (2013.01); *H01L 39/00* (2013.01); *H01L 39/025* (2013.01);
(Continued)

(58) Field of Classification Search
CPC ........ G01J 1/44; G01J 1/02; G01J 2001/4446; G01J 2001/442; H01L 39/025; H01L 39/10; H01L 39/00; H04L 9/0852
See application file for complete search history.

(56) References Cited

U.S. PATENT DOCUMENTS 3,149,299 A * 9/1964 McMahon .............. G11C 11/44
                                                          338/32 S
6,812,464 B1 * 11/2004 Sobolewski ............ H01L 39/10
                                                          250/336.2
(Continued)

FOREIGN PATENT DOCUMENTS

CN        101339077 A      1/2009
JP        2004-363485 A    12/2004
(Continued)

OTHER PUBLICATIONS

Kyosuke Sano et al., "Demonstration of single-flux-quantum readout circuits for time-of-flight mass spectrometry systems using superconducting strip ion detectors," Superconductor Science and Technology, p. 1-5, vol. 28, No. 074003 (2015).
(Continued)

*Primary Examiner* — Tony Ko
(74) *Attorney, Agent, or Firm* — McCormick, Paulding & Huber PLLC

(57) ABSTRACT

Provided are a photon detection device and a photon detection method being practical, capable of performing photon detection in which no afterpulse is generated and generation of a dark count is suppressed, and capable of obtaining a
(Continued)

high counting rate with low jitter. The photon detection device of the present invention includes: a photon detection section having a long plate-shaped superconducting stripline whose plate surface is a photon detection surface, and a bias current supply section supplying a bias current to the superconducting stripline; and a single flux quantum comparator circuit capable of detecting magnetic flux scattered from the superconducting stripline upon photon detection.

9 Claims, 5 Drawing Sheets

(51) Int. Cl.
  *H01L 39/00* (2006.01)
  *H01L 39/02* (2006.01)
  *H01L 39/10* (2006.01)
  *H04L 9/08* (2006.01)

(52) U.S. Cl.
  CPC ........ *H01L 39/10* (2013.01); *G01J 2001/442* (2013.01); *G01J 2001/4446* (2013.01); *H04L 9/0852* (2013.01)

(56) References Cited

U.S. PATENT DOCUMENTS

| | | | |
|---|---|---|---|
| 8,971,977 B2* | 3/2015 | Mukhanov | G11C 11/44 257/35 |
| 2005/0051726 A1 | 3/2005 | Sobolewski et al. | |
| 2014/0175294 A1 | 6/2014 | Frach | |

FOREIGN PATENT DOCUMENTS

| | | |
|---|---|---|
| JP | 2011-176159 A | 9/2011 |
| JP | 2013019777 A | 1/2013 |
| JP | 2014-529923 A | 11/2014 |

OTHER PUBLICATIONS

Extended European Search Report for Serial No. EP 16 81 1642 dated Feb. 20, 2019.
International Search Report for PCT Serial No. PCT/JP2016/067747 dated Aug. 22, 2016.
Berdiyorov, G. R. et al., Spatially dependent sensitivity of supercoducting meanders as single-photon detectors, Appl. Phys. Lett., Jun. 25, 2012, vol. 100, Issue 26, pp. 262603-1-262603-4.
Yamashita, T. et al., Origin of intrinsic dark count in supercoducting nanowire single-photon detectors, Appl. Phys. Lett. Oct. 17, 2011, vol. 99, Issue 16, pp. 161105-1-161105-3.
Sabin, D. et al., Waveguide Nanowire Supercoducting Single-Photon Detectors Fabricated on GaAs and the Study of Their Optical Properties, IEEE Journal of Selected Topics in Quantum Electronics, Mar. 2015, vol. 21, No. 2, p. 3800210, 1-10.
C. M. Natarajan et al., Supercond. Sci. Technol. 25, 063001 (2012); 17 pages.
"Improvement of time resolution of the double-oscillator time-to-digital converter using SFQ circuits" by K. Nakamiya, T. Nishigai, N. Yoshikawa, A. Fujimaki, H. Terai and S. Yorozu, Physica C 463-465 (2007), pp. 1088-1091.

* cited by examiner

UNBINDING OF PAIR OF MAGNETIC FLUX AND DIAMAGNETIC FLUX

PHOTON DETECTION DEVICE AND PHOTON DETECTION METHOD

CROSS-REFERENCE TO RELATED APPLICATIONS

This application is a National Stage application of International Patent Application No. PCT/JP2016/067747, filed on Jun. 15, 2016, which claims priority to Japanese Patent Application Number 2015-123764, filed on Jun. 19, 2015, each of which is hereby incorporated by reference in its entirety.

TECHNICAL FIELD

The present invention relates to a photon detection device and a photon detection method using a superconducting stripline.

BACKGROUND ART

Securing information safety is an urgent task of the network society, and quantum cryptographic communication is expected as a core technology.

However, the current safety key generation rate is not sufficient and not practical. To realize a practical safety key generation rate, it is essential to achieve higher performance of a photon detector, which is an urgent task.

Conventionally, an InGaAs avalanche photodiode (APD) has been widely used for photon detection in the communication wavelength band (1,550 nm), but there are problems of afterpulse generation and a large dark count. These problems are factors in increase of an error rate of key generation, but it is difficult to avoid these problems due to an operation principle of the APD.

Conventionally, a superconducting strip photon detector (SSPD) has also been used for photon detection (see US Unexamined Patent Application Publication No. 2005/0051726 and Japanese Patent Application Laid-Open Publication No. 2011-176159). As features of the SSPD, there is no afterpulse generation, and a dark count is relatively small. Accordingly, the SSPD is a major photon detector which realizes the quantum cryptographic communication.

However, it is difficult for the SSPD to achieve both high sensitivity and a low dark count rate due to an operation principle thereof.

FIG. 1(a) is a diagram illustrating an equivalent circuit of a conventional SSPD photon detection device. The SSPD is a photon detection device having a superconducting stripline with a thickness of several nanometers and a width of several tens to hundreds of nanometers, and is operated by constantly flowing a bias current through the superconducting stripline. When a photon is made incident on the superconducting stripline through which the bias current flows, a complete normal conductive region is formed in a width direction of the superconducting stripline (see N in FIG. 1(a)). Thereupon, the bias current cannot flow in a forward direction, and a current pulse is output to a measurement system. In the SSPD, this current pulse is used as a photon detection signal.

In this case, probability (quantum efficiency) of generation of the current pulse when the photon is made incident on the superconducting stripline, that is, the sensitivity depends on a magnitude of the bias current as illustrated in FIG. 1(b) (see C. M. Natarajan et al., Supercond. Sci. Technol. 25, 063001 (2012)). The larger the bias current, the higher the quantum efficiency (see the left axis), but the dark count also increases at the same time (see the right axis). FIG. 1(b) is a diagram illustrating bias current dependency of quantum efficiency and bias current dependency of a dark count rate.

Thus, it is impossible to achieve both high sensitivity and a low dark count rate in the SSPD photon detection device.

Moreover, since the current pulse is used as a principle of photon detection, it is necessary to use a low noise amplifier for amplifying the current pulse illustrated in FIG. 1(a). The low noise amplifier, however, adversely affects jitter of a detection system.

Furthermore, a fall time T of the current pulse which is the principle of the photon detection is limited by a magnitude of an inductance L of the superconducting stripline. The inductance L is inversely proportional to a cross-sectional area of an entire length of the superconducting stripline. To reduce the magnitude of the inductance L, it is necessary to enlarge the cross-sectional area of the superconducting stripline. However, from the viewpoint of the sensitivity (quantum efficiency), the cross-sectional area of the superconducting stripline must be small. If the cross-sectional area is large, formation of the normal conductive region upon the incidence of the photon becomes incomplete, so that the sensitivity is lowered. For this reason, the inductance L must be increased. Accordingly, the fall of the current pulse is slow, and the fall time T becomes long, so that a response time constant of the system becomes several tens of nanoseconds which is considered to be large, whereby a counting rate of only substantially several hundreds of megahertz is obtained.

SUMMARY

An object of the present invention is to provide a photon detection device and a photon detection method, which solve the aforementioned various problems in the conventional techniques, are practical, can perform photon detection in which no afterpulse is generated and generation of a dark count is suppressed, and can obtain a high counting rate with low jitter.

Means for solving the problems is as follows. Specifically,

<1> A photon detection device including:

a photon detection section including a long plate-shaped superconducting stripline whose plate surface is a photon detection surface, and a bias current supply section supplying a bias current to the superconducting stripline; and a single flux quantum comparator circuit capable of detecting magnetic flux scattered from the superconducting stripline upon photon detection.

<2> The photon detection device according to <1> described above, in which the single flux quantum comparator circuit includes at least a Josephson junction wire having a Josephson junction in the wire, and a superconducting wire electrically connecting the Josephson junction wire and the superconducting stripline, and the superconducting stripline, the superconducting wire, and the Josephson junction wire constitute a superconducting loop capable of detecting the magnetic flux.

<3> The photon detection device according to any of <1> and <2> described above, in which the bias current supply section is a section flowing the bias current with a value of 60% to 85% of a critical current value of the superconducting stripline through the superconducting stripline.

<4> The photon detection device according to any of <1> to <3> described above, in which the superconducting stripline is arranged on an optical waveguide through which a photon of a detection target is guided.

<5> The photon detection device according to <4> described above, in which a plurality of the superconducting striplines are arranged along a light guiding direction of the optical waveguide, a plurality of the photon detection sections and a plurality of the single flux quantum comparator circuits are arranged for the respective superconducting striplines, and an integrated input circuit to which respective output signals output from the single flux quantum comparator circuits are integrally input is further arranged.

<6> The photon detection device according to any of <1> to <5> described above, further including:

a time-to-digital converter measuring a time difference between an input time of a reference time signal and an input time of an output signal output from the single flux quantum comparator circuit or the integrated input circuit along with detection of the magnetic flux and converting the output signal into digital data from the time difference.

<7> A photon detection method of detecting a photon by using the photon detection device according to any of <1> to <6> described above, the method including:

detecting the photon by making the photon incident on a detection surface in a state where a bias current is flowed through a superconducting stripline, and detecting magnetic flux scattered from the superconducting stripline due to incidence of the photon by a single flux quantum comparator circuit.

<8> The photon detection method according to <7> described above, in which the bias current with a value of 60% to 85% of a critical current value of the superconducting stripline is flowed through the superconducting stripline.

According to the present invention, it is possible to provide a photon detection device and a photon detection method, which solve the aforementioned various problems in the conventional techniques, are practical, can perform photon detection in which no afterpulse is generated and generation of a dark count is suppressed, and can obtain a high counting rate with low jitter.

BRIEF DESCRIPTIONS OF THE DRAWINGS

FIG. 1(*b*) is a diagram illustrating bias current dependency of quantum efficiency and bias current dependency of a dark count rate;

FIG. 3(*b*) is an explanatory diagram illustrating an unbinding condition of a pair of magnetic flux and diamagnetic flux;

FIG. 3(*c*) is a diagram illustrating a relation between a phenomenon occurring in the superconducting stripline and a bias current when a photon is incident;

DETAILED DESCRIPTION

First Embodiment

Figure 2:
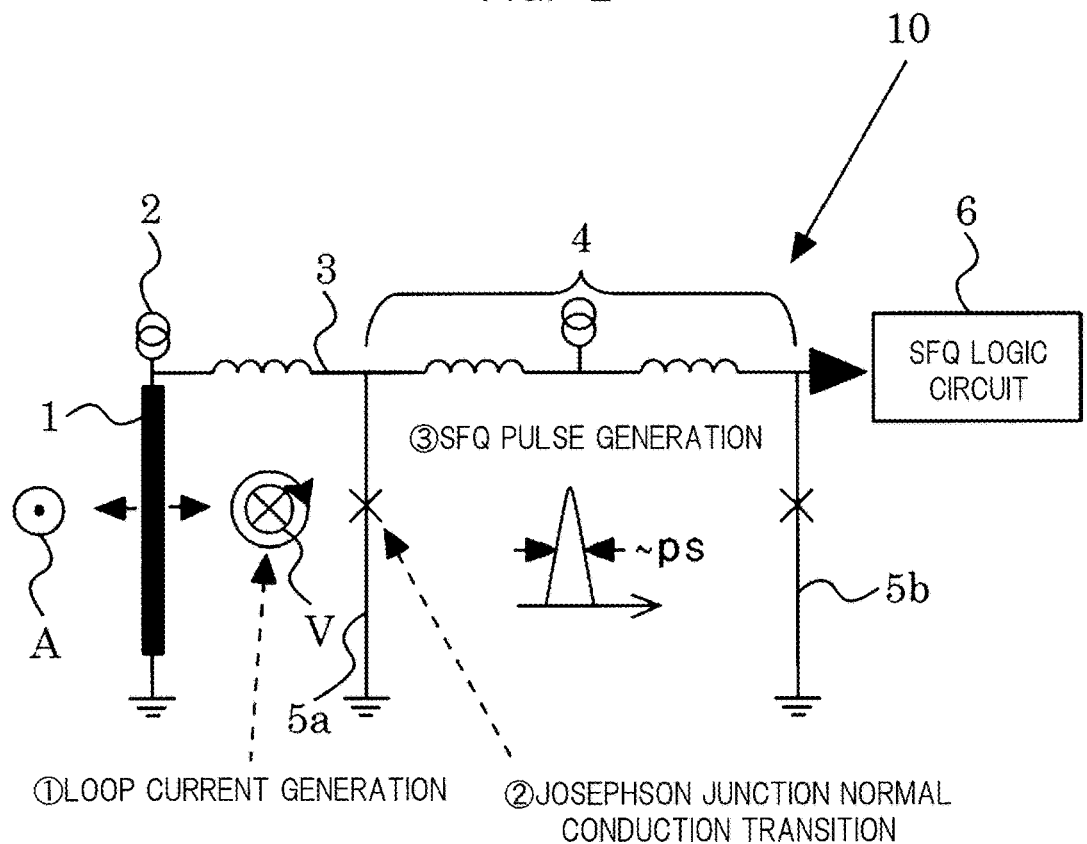
FIG. 2 is an explanatory diagram illustrating an outline of a first embodiment of the present invention.

An outline of a first embodiment of the present invention is illustrated in FIG. 2.

A photon detection device 10 mainly includes a superconducting stripline 1 and a Josephson transmission line (JTL) circuit 4 serving as a single flux quantum (SFQ) circuit.

The superconducting stripline 1 is a long plate-shaped member whose plate surface is a photon detection surface. This superconducting stripline 1 is not particularly limited and may be suitably selected from known ones to be used.

Moreover, a shape of the superconducting stripline 1 is not particularly limited. Herein, the superconducting stripline 1 has a linear shape for the purpose of stabilizing magnetic flux detection in the JTL circuit 4 by excluding the magnetic flux, which is excluded from the superconducting stripline 1, in a direction orthogonal to a length direction of the line. However, even in the case of the linear shape, this does not hinder addition of a portion with a shape other than a linear shape besides the linear portion as long as the magnetic flux excluded from the line upon incidence of a photon can be detected by the JTL circuit 4.

A line width of the superconducting stripline 1 is not particularly limited and is generally substantially 10 nm to 200 nm, and a thickness thereof is also not particularly limited and is substantially 1 nm to 20 nm.

Also, a length of the superconducting stripline 1 is not particularly limited and is preferably 1 μm or more and less than 10 μm and more preferably, 2 μm to 5 μm. Photon absorptance decreases if the length is less than 1 μm, and current detection sensitivity in the JTL circuit 4 may decrease if the length is 10 μm or more.

A bias current is supplied to the superconducting stripline 1. A bias current supply section supplying the bias current is not particularly limited and is, for example, a section supplying a bias current with a suitable magnitude through a current source 2. In the photon detection device 10, the superconducting stripline 1 and the bias current supply section constitute a photon detection section.

In the photon detection device 10, a Josephson junction wire 5*a*, which constitutes the first stage of the JTL circuit 4 and has a Josephson junction (junction indicated by X in FIG. 2) in the wire, and a superconducting wire 3, which electrically connects the Josephson junction wire 5*a* and the superconducting stripline 1, are arranged, and the superconducting stripline 1, the superconducting wire 3, and the Josephson junction wire 5*a* constitute a superconducting loop capable of detecting the magnetic flux.

That is, in the photon detection device 10, the superconducting wire 3 and the Josephson junction wire 5*a* constitute an SFQ comparator circuit.

The superconducting wire 3 is not particularly limited, and one with a relatively small capacitor may be adopted. To easily flow the bias current through the superconducting stripline 1, one with a relatively large capacitor may be adopted. Moreover, the superconducting stripline 1 and the Josephson junction wire 5*a* are connected with a common ground to constitute the superconducting loop.

Note that the JTL circuit 4 is not particularly limited and can have the same configuration as a known JTL circuit. Furthermore, the Josephson junction includes a junction generating the Josephson effect, for example, a junction with a mode (weak coupling) formed by processing a portion of a superconductive material to be thinner than other portions, besides a mode in which a thin insulating film is sandwiched between two superconductive materials.

To capture the magnetic flux scattered from the superconducting stripline 1 by the superconducting loop, the photon detection device 10 is configured such that, for example, the Josephson junction wire 5a is arranged on an extension of the superconducting stripline 1 in the width direction and parallel to the length direction of the linear superconducting stripline 1.

Moreover, to avoid attenuation of the magnetic flux, the Josephson junction wire 5a is preferably arranged in the vicinity of the superconducting stripline 1, and a distance between the superconducting stripline 1 and the Josephson junction wire 5a is preferably 1 μm to 10 μm as the shortest distance.

The photon detection device 10 of a modification example may be also configured such that the superconducting stripline 1 and the JTL circuit 4 are provided as separate bodies without providing the superconducting wire 3 so as to detect the magnetic flux scattered from the superconducting stripline 1 with the superconducting loop in the JTL circuit 4. In this modification example, the JTL circuit 4 includes the SFQ comparator circuit.

However, when the superconducting loop is constituted by the superconducting stripline 1, the superconducting wire 3, and the Josephson junction wire 5a illustrated in FIG. 2, the superconducting wire 3, the superconducting stripline 1 which discharges the magnetic flux, and the Josephson junction wire 5a which can detect the magnetic flux as an SFQ pulse are formed as a monolithic body, in such a manner that an arrangement relation of each part is fixed, so that a photon can be stably detected, which is more practical.

Moreover, since the superconducting stripline 1 itself constitutes the superconducting loop, the magnetic flux is easily captured, and the magnetic flux can be detected with higher detection sensitivity than the configuration of the modification example, in which the magnetic flux scattered from the outside of the superconducting loop is detected, which is more practical.

Furthermore, if the same superconductive material is used for the wires constituting the photon detection section including the superconducting stripline 1 and for the wires constituting the comparator circuit (superconducting wire 3 and Josephson junction wire 5a), manufacturing efficiency can be improved, as well as microfabrication can be facilitated, which is more practical.

The JTL circuit 4 is connected to an SFQ logic circuit 6. The SFQ logic circuit 6 is not particularly limited and is, for example, a time-to-digital converter (TDC) which measures a time difference between an input time of a reference time signal and an input time of an output signal output from the SFQ comparator circuit (JTL circuit 4) along with detection of the magnetic flux and converts the output signal into digital data from the time difference.

The TDC is not particularly limited and may be suitably selected from known ones to be used. For operation in an extremely low temperature environment, the TDC is preferably an SFQ-TDC constituted by an SFQ circuit described in the following reference and developed by the inventors. The SFQ-TDC can perform signal processing with timing jitter of 2.5 picoseconds or less.

The signal converted into the digital data by the TDC is transmitted to a device under a room temperature environment outside the device. In general, a cable which enables broadband transmission is also a good heat conductor, and thus, it is difficult to transmit an ultrafast pulse to a device under the room temperature environment. In contrast, a cable for transmitting a signal converted into digital data may be one for MHz band transmission, and by such cable, the signal can be transmitted to a device under the room temperature environment.

Reference: K. Nakamiya, T. Nishigai, N. Yoshikawa, A. Fujimaki, H. Terai and S. Yorozu, "Improvement of time resolution of the double-oscillator time-to-digital converter using SFQ circuits," Physica C 463, 1088 (2007).

Note that the photon detection device 10 performs superconducting operation and thus is housed in a refrigerator or the like (not illustrated) to be used.

—Operation Principle and Operation Method—

An operation principle and an operation method of the photon detection device 10 will be described.

Figure 3A:
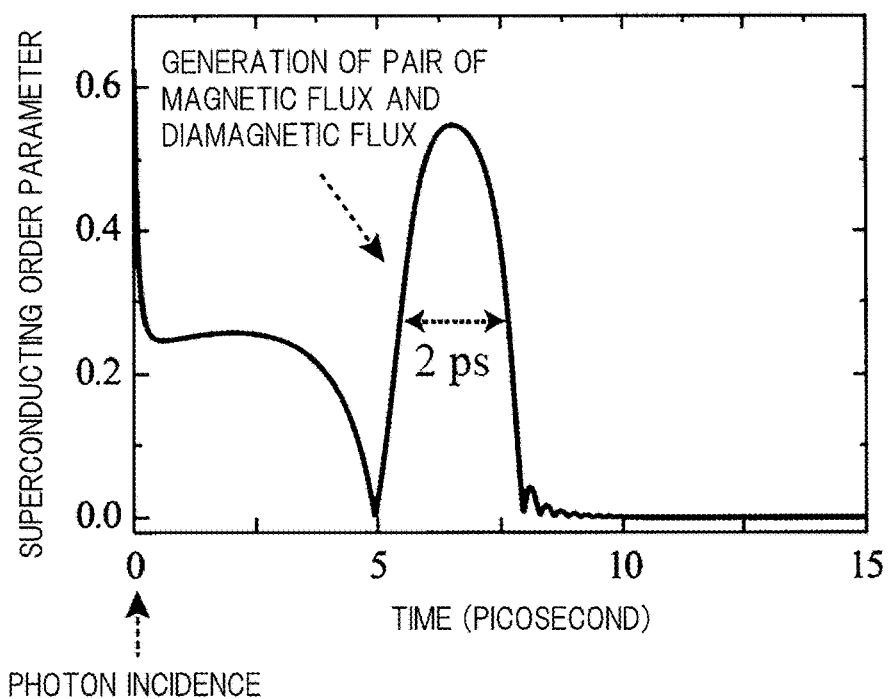
FIG. 3(*a*) is a diagram illustrating a result of simulating time variation of a superconducting order parameter when a photon is made incident on a superconducting stripline.

First, in the aforementioned the photon detection section, when a photon is made incident on the detection surface of the superconducting stripline 1 in a state where the bias current is flowed, a pair of magnetic flux and diamagnetic flux is unbound. It is assumed that generation of the pair of magnetic flux and diamagnetic flux is caused by variation of a superconducting order parameter. FIG. 3(a) is a diagram illustrating a result of simulating time variation of the superconducting order parameter when a photon is made incident on the superconducting stripline. As illustrated in FIG. 3(a), it is clear that an amplitude of the superconducting order parameter varies by substantially five picoseconds later after the photon is made incident.

Figure 3B:
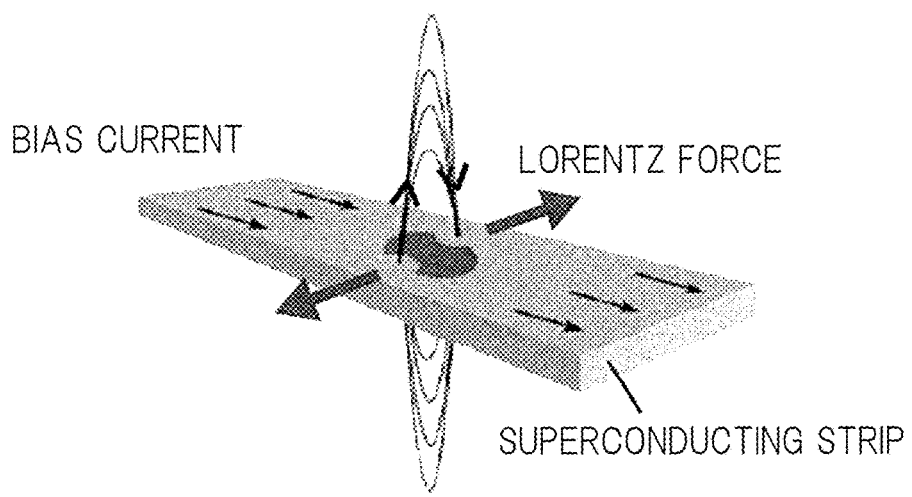

FIG. 3(b) is an explanatory diagram illustrating an unbinding condition of the pair of magnetic flux and diamagnetic flux. The pair of magnetic flux and diamagnetic flux generated in the superconducting stripline 1 due to the variation of the superconducting order parameter receives the Lorentz force by the bias current flowing through the superconducting stripline 1, and the pair of magnetic flux and diamagnetic flux is unbound. Each of the pair of magnetic flux and diamagnetic flux is excluded from the superconducting stripline 1 in a direction orthogonal to the flowing direction of the bias current, that is, in the width direction of the superconducting stripline 1, and these fluxes are scattered from the superconducting stripline 1.

Note that, when the bias current flowing through the superconducting stripline 1 is sufficiently large close to the critical current at this time, a complete normal conductive region is formed in the width direction of the superconducting stripline 1. In the conventional SSPD, a current pulse is output by forming such a complete normal conductive region in the width direction of the superconducting stripline 1. In other words, this means that it is necessary to flow a sufficiently large bias current close to the critical current of the superconducting stripline 1.

Figure 3C:
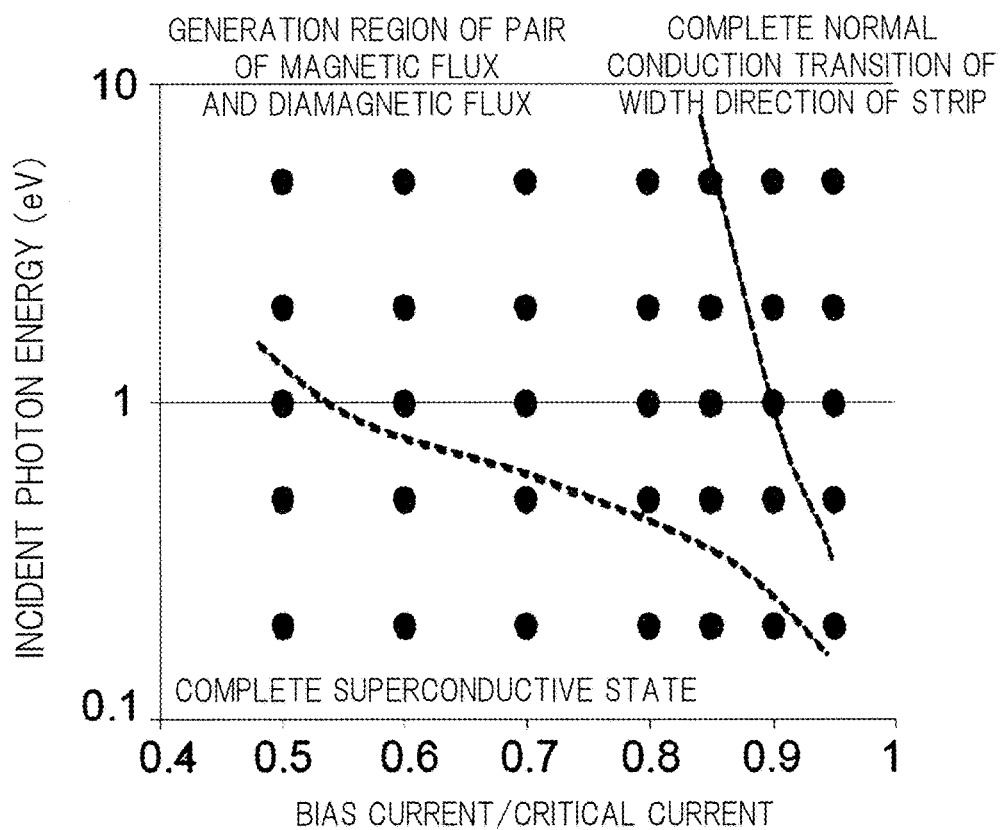

FIG. 3(c) is a diagram illustrating a relation between a phenomenon occurring in the superconducting stripline and the bias current when a photon is incident. As illustrated in FIG. 3(c), it is clear that, to obtain a complete normal conductive state in the width direction of the superconducting stripline 1, with respect to incidence of a photon (an energy of about 1 eV) in the communication wavelength band (1550 nm), a bias current with a value of 90% or more of the critical current value is necessary (upper right region in the drawing).

In contrast, although the complete normal conductive state is not obtained in the width direction of the superconducting stripline 1 in the region (central region in the drawing) where a bias current with a value of 85% or less of the critical current value is flowed, the pair of magnetic flux and diamagnetic flux can be generated. Moreover, the pair of magnetic flux and diamagnetic flux is not generated in the region (lower left region in the drawing) where a bias current with a value of less than 60% of the critical current value is flowed.

In the region where the bias current with a value of 90% or more of the critical current value is flowed, the superconducting order parameter is unstable, and the dark count is likely to be generated.

In the photon detection device 10, by flowing a bias current with a value of 60% to 85% of the critical current value of the superconducting stripline 1 through the superconducting stripline 1, the photon in the communication wavelength band can be detected without the dark count.

Description will be made with reference to FIG. 2 again.

The magnetic flux scattered from the superconducting stripline 1 is captured as a single flux quantum by the superconducting loop constituted by the superconducting stripline 1, the superconducting wire 3, and the Josephson junction wire 5a and generates a pulsed loop current in the superconducting loop. At this time, when a bias current is flowed through the Josephson junction wire 5a, which constitutes the first stage of the JTL circuit 4 and has the Josephson junction (junction indicated by X in FIG. 2) in the wire, a sum of the loop current and the bias current temporarily exceeds a critical current value of the Josephson junction of the Josephson junction wire 5a, the Josephson junction transitions to normal conduction, and the SFQ pulse is generated on the Josephson junction wire 5a.

The SFQ pulse flowing through the Josephson junction wire 5a generates a current on the right side (output side) of the circuit. The current generated on the right side (output side) of the circuit is generated such that the current temporarily exceeds a critical current value of the Josephson junction when a bias current is flowed through a Josephson junction wire 5b constituting the second stage of the JTL circuit 4 and having a Josephson junction (junction indicated by X in FIG. 2) in the wire, that the Josephson junction transitions to normal conduction, and that the SFQ pulse on the Josephson junction wire 5a propagates on the Josephson junction wire 5b. Note that the response time constant of the generated SFQ pulse can be set to several picoseconds even in a general JTL circuit.

The SFQ pulse propagating through the JTL circuit 4 is output to the SFQ logic circuit 6, converted into digital data, and transmitted to a device under the room temperature environment by an appropriate cable. By using the SFQ-TDC as the SFQ logic circuit 6, the signal processing can be performed with a timing jitter of 2.5 picoseconds or less.

Note that, although the Josephson junction wire 5a constituting the first stage of the JTL circuit 4 has been described as a constituent member of the comparator circuit in the aforementioned photon detection device 10, the JTL circuit 4 itself is a section transmitting the SFQ pulse generated on the Josephson junction wire 5a and can be considered separately from the comparator circuit.

Therefore, a photon detection device of still another modification example may be constituted by the photon detection section including the superconducting stripline 1, and a comparator circuit constituted by a known bias current supply section supplying a bias current to the Josephson junction wire 5a and by a known detection section detecting the SFQ pulse generated on the Josephson junction wire 5a, in addition to the superconducting wire 3 and the Josephson junction wire 5a, without having the JTL circuit 4 in FIG. 2.

Figure 1A:
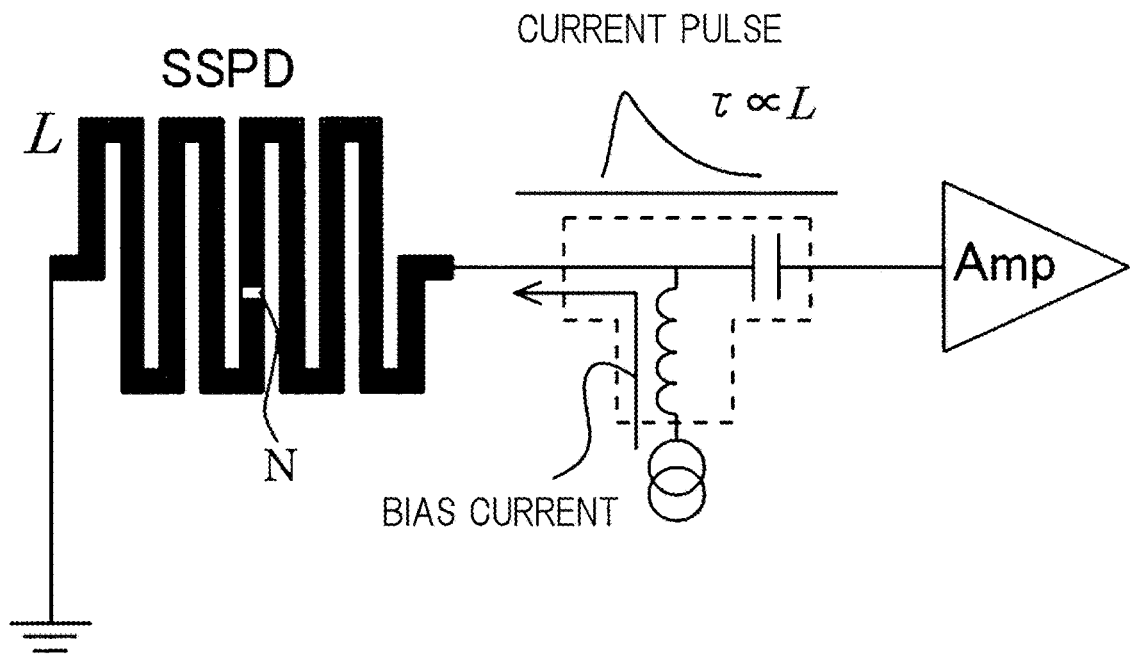
FIG. 1(*a*) is a diagram illustrating an equivalent circuit of a conventional SSPD photon detection device.
Figure 1B:
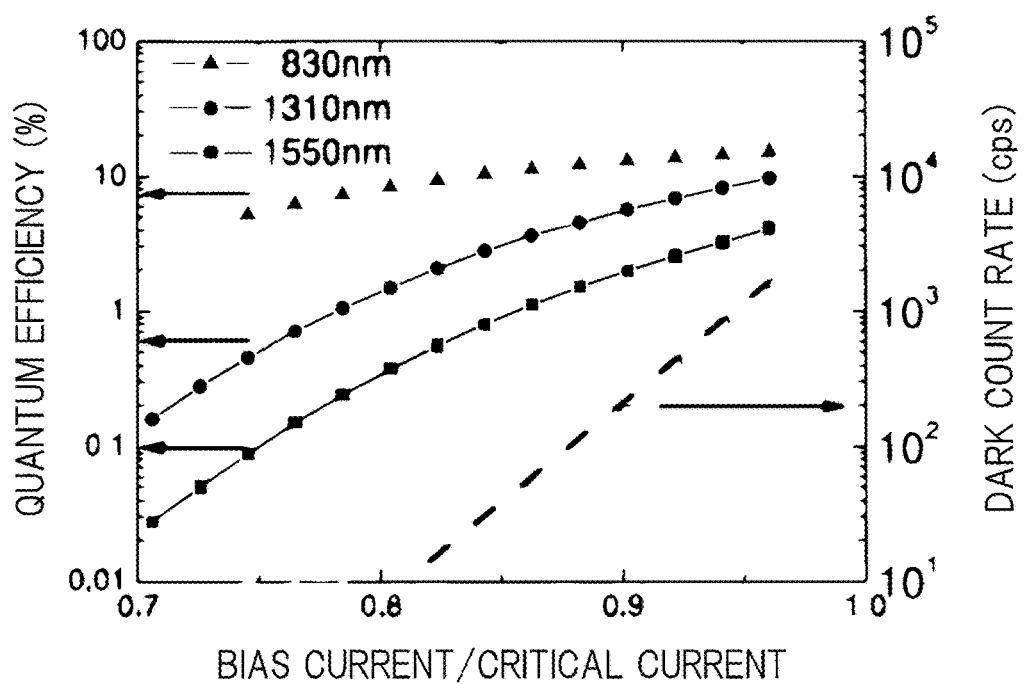

As described above, (1) since the photon detection device 10 uses the superconducting stripline 1 for the photon detection, there is no afterpulse like the APD. (2) Moreover, since the device can operate with a lower bias current/critical current ratio than the SSPD, photon detection can be performed with generation of the dark count suppressed. (3) Furthermore, since a weak current pulse in the superconducting stripline 1 is not used as the principle of the photon detection, it is unnecessary to use a low noise amplifier (see FIG. 1(a)) arranged in the SSPD and possible to reduce the jitter in the measurement system in principle. (4) Further, in the SSPD, since the fall time T of the superconducting stripline 1 is limited by the inductance L of the superconducting stripline (see FIG. 1(a)), the response time constant is set to several tens of nanoseconds, and the counting rate of the photon is only substantially several hundreds of megahertz. However, in the photon detection device 10, the counting rate is not limited by the inductance L of the superconducting stripline 1, and the response time constant is determined by the time width of the magnetic flux generation (see FIG. 3(a)) or the fall time of the SFQ pulse (see FIG. 2) and set to several picoseconds in both cases. This means that the counting rate can be improved by three orders of magnitude or more, compared to that of the SSPD.

Second Embodiment

Figure 4:
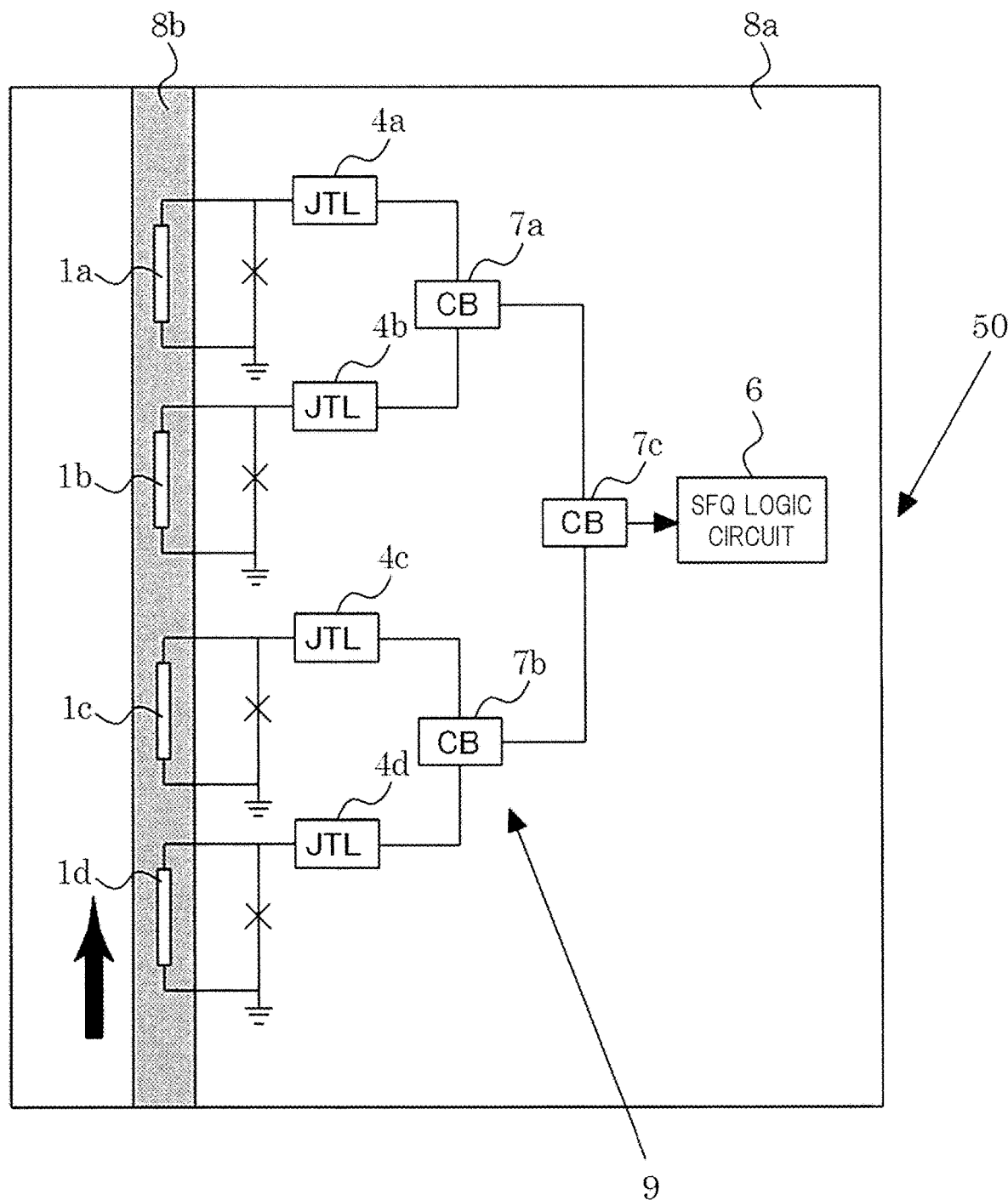
FIG. 4 is an explanatory diagram illustrating an outline of a second embodiment of the present invention.

Next, a second embodiment of the present invention will be described. FIG. 4 is an explanatory diagram illustrating an outline of the second embodiment of the present invention.

A photon detection device 50 is mainly constituted by monolithically forming superconducting striplines 1a to 1d, JTL circuits 4a to 4d, integrated input circuits (confluence buffer (CB)) 7a to 7c, an SFQ logic circuit 6, an optical waveguide 8b, photon detection sections, and a comparator circuit on a substrate 8a. Note that, since the detail of each part of the superconducting striplines 1a to 1 d, the JTL circuits 4a to 4d, the SFQ logic circuit 6, the photon detection sections, and the comparator circuit is the same as that of each of the superconducting stripline 1, the JTL circuit 4, the SFQ logic circuit 6, the photon detection section, and the comparator circuit in the photon detection device 10, descriptions on configuration and operation of each part are omitted.

The superconducting striplines 1a to 1d are formed on the optical waveguide 8b. The optical waveguide 8b is constituted by, for example, a known silicon waveguide or the like.

As for the optical waveguide 8b, for example, light is introduced from a lower end side in the drawing by a light supply source such as an optical fiber, and the light can be guided in an arrow direction. The light guided into the optical waveguide 8b is made incident on the superconducting striplines 1a to 1 d.

With this configuration, for example, a photon can be made incident on the superconducting stripline 1a with a higher probability than a configuration in which a photon is directly made incident on the superconducting stripline 1a by emitting the photon from a light supply source.

Moreover, the four separate superconducting striplines 1a to 1d are arranged on the optical waveguide 8b.

When one long large superconducting stripline is arranged in place of these superconducting striplines 1a to 1d, a photon absorptance of about 90% can be realized with a length of substantially 10 μm, and the photon absorptance is decreased by 1 dB as the length is shortened by 1 μm.

However, when such a long large superconducting stripline is used, current sensitivity in the superconducting loop may decrease. A magnitude of a loop current $I_L$ produced by the magnetic flux is expressed by the following equation, $I_L = \phi/L$. In the equation, $\phi$ represents a single flux quantum of $2 \times 10^{-15}$ Wb, and L represents the inductance of the superconducting stripline. For the magnetic flux detection sensitivity of the JTL circuit, $I_L$ is demanded to be a certain value or more, but L becomes large if the superconducting stripline is long.

Therefore, as illustrated in FIG. 4, the plurality of superconducting striplines (1a to 1d) with relatively short lengths are arranged along a light guiding direction of the optical waveguide 8b, and these superconducting striplines with short lengths as a whole advantageously play a role of the one long superconducting stripline.

In the photon detection device 50, the pluralities of photon detection sections (not illustrated) and JTL circuits (JTL circuits 4a to 4d) are arranged for respective superconducting striplines 1a to 1d. Further, the CB circuit 7a to which respective output signals output from the JTL circuits 4a and 4b are integrally input, and the CB circuit 7b to which respective output signals output from the JTL circuits 4c and 4d are similarly and integrally input are arranged. Still further, the CB circuit 7c to which respective output signals output from the CB circuits 7a and 7b are integrally input is arranged. The superconducting striplines 1a to 1d, the JTL circuits 4a to 4d, the CB circuits 7a to 7c, the SFQ logic circuit 6, and the optical waveguide 8b constitute one monolithic photon detection array 9.

Each of the CB circuits 7a to 7c can be constituted by suitably selecting a circuit configuration used in a known SFQ circuit.

Note that, as the substrate 8a, for example, a known substrate such as a silicon oxide substrate can be used. Moreover, the digital data output from the SFQ logic circuit 6 is transmitted to a device under the room temperature environment by a cable (not illustrated) or the like.

In the photon detection device 50 constituted in this way, if a photon can be absorbed by at least one of the superconducting striplines 1a to 1d, the photon can be detected, and the photon detection efficiency can be dramatically improved.

Third Embodiment

Figure 5:
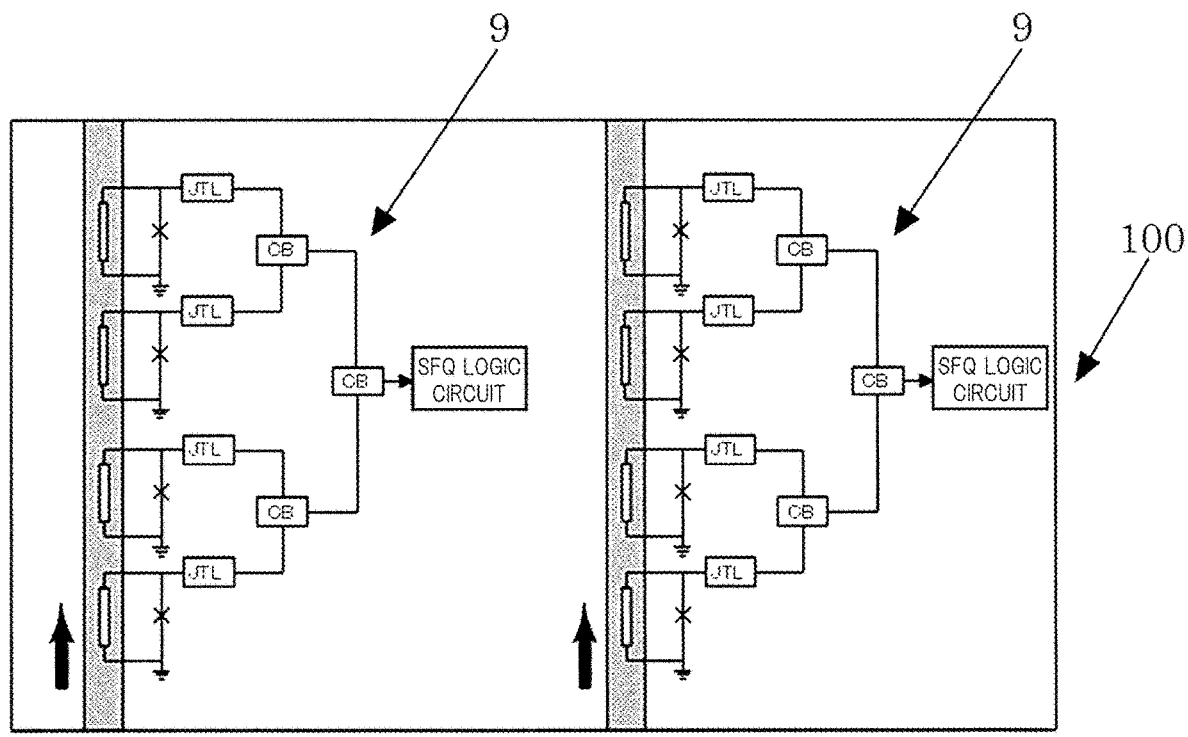
FIG. 5 is an explanatory diagram illustrating an outline of a third embodiment of the present invention.

Next, a third embodiment of the present invention will be described. FIG. 5 is an explanatory diagram illustrating an outline of the third embodiment of the present invention.

A photon detection device 100 illustrated in FIG. 5 is constituted as a monolithic device in which a plurality of photon detection arrays 9 in the photon detection device 50 illustrated in FIG. 4 are arranged on the same substrate. Other than this, the photon detection device 100 is the same as the photon detection device 50, and thus, description thereof is omitted.

According to this photon detection device 100, a photon from a light supply source such as an independent optical fiber or the like can be independently detected by each photon detection array 9, and communication signals from a plurality of information sources can be processed. For example, in a setup of polarization (4)×dual wavelength multiplexing (2)×transmission/reception (2), which is the basic setup of quantum entangled quantum cryptographic communication, 16 communication signals in total are demanded to be processed independently. If 16 photon detection arrays 9 are arranged on the same substrate, the device can be applied to such a communication field.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A photon detection device comprising:
   a photon detection section including a long plate-shaped superconducting stripline whose plate surface is a photon detection surface, and a bias current supply section supplying a bias current to the superconducting stripline; and
   a single flux quantum comparator circuit capable of detecting magnetic flux scattered from the superconducting stripline upon photon detection,
   wherein
   the superconducting stripline and the photon detection section do not include a Josephson junction,
   the single flux quantum comparator circuit includes at least a Josephson junction wire having a Josephson junction in the wire, and a superconducting wire electrically connecting the Josephson junction wire and the superconducting stripline,
   the superconducting stripline and the superconducting wire are made of the same superconductive material so as to configure a continuous structure having no discontinuous contact points such as interface resistance, and
   the superconducting stripline, the superconducting wire, and the Josephson junction wire constitute a superconducting loop capable of detecting the magnetic flux.

2. The photon detection device according to claim 1, wherein the bias current supply section is a section flowing the bias current with a value of 60% to 85% of a critical current value of the superconducting stripline through the superconducting stripline.

3. The photon detection device according to claim 1, further comprising,
   an optical waveguide through which a photon of a detection target is guided,
   wherein the superconducting stripline is arranged on the optical waveguide.

4. The photon detection device according to claim 3, wherein a plurality of the superconducting striplines are arranged along a light guiding direction of the optical waveguide, a plurality of the photon detection sections and a plurality of the single flux quantum comparator circuits are arranged for the respective superconducting striplines, and an integrated input circuit to which respective output signals output from the single flux quantum comparator circuits are integrally input is further arranged.

5. The photon detection device according to claim 4, further comprising:
   a time-to-digital converter measuring a time difference between an input time of a reference time signal and an input time of an output signal output from the single flux quantum comparator circuit or the integrated input circuit along with detection of the magnetic flux and converting the output signal into digital data from the time difference.

6. The photon detection device according to claim 1, wherein the Josephson junction wire is arranged on an extension of the superconducting stripline in a width direction and parallel to a length direction of the superconducting stripline via the superconducting wire.

7. The photon detection device according to claim 1, wherein the Josephson junction wire is arranged on an extension of the superconducting stripline in a width direction and parallel to a length direction of the superconducting stripline via the superconducting wire, a second-stage Josephson junction wire is arranged on the extension of the superconducting stripline in the width direction with respect to the Josephson junction wire, and a time-to-digital converter measuring a time difference between an input time of a reference time signal and an input time of an output signal output from the single flux quantum comparator circuit along with detection of the magnetic flux and converting the output signal into digital data from the time difference is connected with respect to the second-stage Josephson junction wire.

8. A photon detection method of detecting a photon by using a photon detection device, the device comprising:

a photon detection section including a long plate-shaped superconducting stripline whose plate surface is a photon detection surface, and a bias current supply section supplying a bias current to the superconducting stripline; and a single flux quantum comparator circuit capable of detecting magnetic flux scattered from the superconducting stripline upon photon detection, wherein the superconducting stripline and the photon detection section do not include a Josephson junction, the single flux quantum comparator circuit includes at least a Josephson junction wire having a Josephson junction in the wire, and a superconducting wire electrically connecting the Josephson junction wire and the superconducting stripline, the superconducting stripline and the superconducting wire are made of the same superconductive material so as to configure a continuous structure having no discontinuous contact points such as interface resistance, the superconducting stripline, the superconducting wire, and the Josephson junction wire constitute a superconducting loop capable of detecting the magnetic flux, and the method comprises:

detecting magnetic flux scattered from the superconducting stripline by the single flux quantum comparator circuit by making the photon incident on the photon detection surface in a state where the bias current is flowed through the superconducting stripline.

9. The photon detection method according to claim 8, wherein the bias current with a value of 60% to 85% of a critical current value of the superconducting stripline is flowed through the superconducting stripline.

* * * * *